Patented Oct. 8, 1935

2,016,630

UNITED STATES PATENT OFFICE 2,016,630

METHOD OF MAKING AN ALDOL CONDENSATION PRODUCT

John Vargas Eyre and Herbert Langwell, Epsom, England, assignors to The Distillers Company Limited, Edinburgh, Scotland, a British company No Drawing. Application October 18, 1933, Serial No. 694,191. In Great Britain December 6, 1932

5 Claims. (Cl. 260—140)

This invention has for its object the production of aldol condensation products.

It is usual in the manufacture of condensation products from aldehydes to take special precautions to prevent the formation of products involving more than two molecules of aldehyde. Such condensations are, for example, the manufacture of aldol, crotonaldehyde and ethyl propyl acrolein. The higher polymers are usually resinous in character and their formation has hitherto been regarded as an indication that the condensation reaction has become out of control.

According to the present invention the process of condensation of an aldol is effected by treating it in the presence of water—preferably derived wholly or in part from the waste water of a previous condensation—with an amount of strong alkali only sufficient to maintain the mixture in a condition just alkaline with respect to phenol phthalein during the reaction, whereby the degree of molecular complexity of the product is limited. When acetaldol is used as starting material the condensation product is an orange liquid of average molecular complexity represented approximately by $C_{12}$.

The stage of condensation may be determined by estimating the amount of free carbonyl group $(:CO)$ present at any moment, using for example the hydroxylamine method.

The stage in point of time at which the condensation product commences to separate out as a lower layer of liquid insoluble in the upper aqueous one may be reached in a few minutes or a few days according to the control imposed by regulation of temperature and by suitable choice of the strength of the alkali solution added, the rate of reaction increasing with rise of temperature and with relatively high concentrations of alkali solution added. The temperature may vary from atmospheric to 45° C. or more, and the strength of alkali solution added may vary from an extremely weak one up to 30 or more per cent.

As an example it may be stated that starting with 6.8 litres of commercial acetaldol which is acid to phenol phthalein a satisfactory procedure is to dilute it with about half its volume of water i. e. 3.4 litres, and to admix therewith 35 to 40 grams of caustic soda in the form of a 30 per cent. aqueous solution. The mixture is warmed to 45° C. whereupon condensation starts and is completed in about 4 hours. The reaction is exothermic and the temperature should therefore be kept from rising appreciably above the stated temperature; it can in fact be regulated to ensure a smoothly proceeding reaction. On allowing the mixture to stand, an orange resinous liquid settles out leaving a top aqueous layer which can be drawn off and used as addition water for further reaction so as to avoid loss of incompletely reacted material remaining in this layer.

Analysis of the resinous layer was as follows in the particular case described:—

|  | Per cent. |  |
|---|---|---|
| Free water | 14.0 | |
| Carbon | 62.0 | Vacuum dried residue |
| Hydrogen | 8.8 | |
| Oxygen | 29.2 | |

Carbon and oxygen in the form of carbonyl radical amounted to from 10.4 to 12.2 per cent. Average molecular complexity approximately $C_{12}$.

The acetaldol used as starting material may be obtained from any convenient source, as for example by condensation of acetaldehyde.

In place of acetaldol, other aldols or a mixture of aldols may be employed.

The products obtained by the foregoing process may be used as such, as for example as a froth or foam producing agent, or as starting material in further conversions.

What we claim is:—

1. In the production of aldol condensation products from aldols by means of alkali in the presence of water, the step of adding an amount of strong alkali only sufficient to maintain the mixture in a condition just alkaline with respect to phenol phthalein during the reaction, and finally separating out the condensation product.

2. In the production of aldol condensation products from aldols by means of alkali in the presence of water, the step of adding an amount of strong alkali only sufficient to maintain the mixture in a condition just alkaline with respect to phenol phthalein during the reaction, separating out the condensation product from the aqueous layer, and utilizing the aqueous layer as addition water to a further quantity of aldol.

3. In the production of aldol condensation products from aldols by means of alkali in the presence of water, the steps of diluting the aldol with about half its volume of water, adding an amount of strong alkali only sufficient to maintain the mixture in a condition just alkaline with respect to phenol phthalein during the reaction, maintaining a moderately raised temperature until the reaction is complete, and separating out the condensation product.

4. The method of manufacturing an aldol condensation product consisting in diluting acetaldol with about half its volume of water, adding an amount of caustic alkali solution of about 30 per cent. strength only sufficient to maintain the mixture in a condition just alkaline to phenol phthalein during the reaction, producing and maintaining a temperature of about 45° C., for about four hours, and separating out the resultant condensation product.

5. The cyclic method of manufacturing an acetaldol condensation product consisting in diluting acetaldol with about half its volume of the residual aqueous liquor of a preceding operation, adding an amount of a strong alkali only sufficient to maintain the mixture in a condition just alkaline to phenol phthalein during the reaction, and separating out the condensation product from the residual aqueous liquor.

J. VARGAS EYRE.
HERBERT LANGWELL.